United States Patent

Gätzi et al.

[11] 4,000,311
[45] Dec. 28, 1976

[54] SUBSTITUTED 1,3-BENZODIOXANE AGENTS FOR THE CONTROL OF PLANT BACTERIA

[75] Inventors: Karl Gätzi, Basel; Max Schellenbaum, Muttenz, both of Switzerland

[73] Assignee: Ciba-Geigy Corporation, Ardsley, N.Y.

[22] Filed: May 29, 1975

[21] Appl. No.: 582,061

Related U.S. Application Data

[62] Division of Ser. No. 489,218, July 17, 1974, abandoned.

[30] Foreign Application Priority Data

July 20, 1973 Switzerland .................... 10653/73

[52] U.S. Cl. .............................. 424/278; 260/340.3
[51] Int. Cl.² ......................................... A01N 9/28
[58] Field of Search ................. 424/278; 260/340.3

[56] References Cited

FOREIGN PATENTS OR APPLICATIONS 876,333  7/1949  Germany

OTHER PUBLICATIONS

Buehler et al., Chem. Abst., vol. 36 (1942) p. 774[2].
Ziegler et al., Chem. Abst., vol. 38 (1944) p. 2341[2].
Adams et al., Chem. Abst., vol. 17 (1923) p. 3867[8].

*Primary Examiner*—Jerome D. Goldberg
*Assistant Examiner*—Allen J. Robinson
*Attorney, Agent, or Firm*—Harry Falber

[57] ABSTRACT

Agents for the control of plant bacteria, which agents contain, as active substance, a benzo-1,3-dioxane derivative of formula I

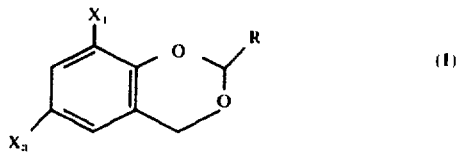

wherein
R represents hydrogen, $C_1$-$C_6$-alkyl, $C_2$-$C_6$-alkenyl or styryl, and $X_1$ and $X_3$ each independently represent chlorine or bromine, together with suitable carriers and/or further additives.

7 Claims, No Drawings

SUBSTITUTED 1,3-BENZODIOXANE AGENTS FOR THE CONTROL OF PLANT BACTERIA

This is a divisional of application Ser. No. 489,218 filed on July 17, 1974, now abandoned.

The present invention relates to agents for the control of plant bacteria, which agents contain as active substaces 6,8-disubstituted 1,3-benzodioxane derivatives of formula I.

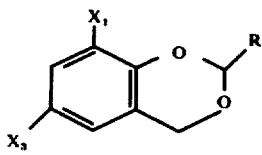

wherein R represents hydrogen, $C_1$-$C_6$-alkyl, $C_2$-$C_6$-alkenyl or styryl, and $X_1$ and $X_3$ ech independently represent chlorine or bromine.

One of the preferred sub-groups is that wherein $X_1$ and $X_3$ represent chlorine, and R represents hydrogen, $C_1$-$C_6$-alkyl, $C_3$-alkenyl or styryl.

The invention relates also to the use of compounds of formula I for the control of harmful plant bacteria, especially for the control of Pseudomonas and Xanthomonas types of bacteria.

The invention relates also to the new compounds of formula Ia

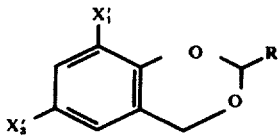

wherein R represents $C_1$-$C_6$-alkyl, $C_3$-$C_6$-alkenyl or styryl, and $X'_1$ and $X'_3$ each independently represent chlorine or bromine, and wherein R also stands for hydrogen if one of the substituents $X'_1$ ad $X'_3$ represent chlorine and the other bromine.

The new compounds of formula Ia are prepared according to the invention a. by reaction of a compound of the formula

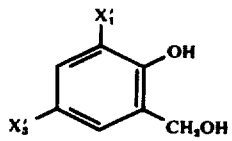

with a compound of formula III

in the presence of an acid, or b. by reaction, in the cases where in formula Ia the symbol R represents hydrogen, of a phenol of formula IV

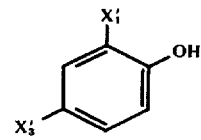

with formaldehyde or paraformaldehyde, in the presence of an acid.

In formulae II, III and IV, the symbols R, $X'_1$ and $X'_3$ have the meanings given under formula Ia.

The process can be performed if need be in the presence of solvents which are inert to the reactants, and is performed at normal pressure and at a temperature of between 0° and 120° C.

Acids that may be mentioned are inorganic acids such as, for example, sulphuric acid, hydrochloric acid, phosphoric acid, hydrobromic acid, and Lewis acids such as boron trifluoride, as well as organic acids such as, for example, acetic acid, benzenesulphonic acid and p-toluenesulphonic acid.

The compounds of formula I are suitable, in particular, for the control of phytopathogenic bacteria on corn, maize, potatoes, rice, vegetables, grape vines, ornamental plants and fruit, and on other crops.

Phytopathogenic bacteria that may be mentioned are, inter alia, members of the order Pseudomonas, e.g. Pseudomonas tomato, Pseudomonas lachrymans, Ps. morsprunorum, Ps. phaseolicola, Ps. syringae and those of the order Xanthomonas, e.g. Xanthomonas oryzae, Xanthomonas vesicatoria, Xanthomonas phaseoli and Xanthomonas campestris, as well as Erwinia and Corynebacterium.

For the broadening of their range of action, the compounds of formula I can naturally be used together with other suitable pesticidal active substances and thus adapted to suit the given conditions.

A particular property of the compounds of formula I is their systemic action against phytopathogenic bacteria, i.e. their ability to become transported in a plant to a site of infection remote from the point of application. Thus, after treatment of the soil, such an active substance can be absorbed by the roots of the plant and transported to the site of infection.

The compounds of formula I can be used on their own or together with suitable carriers and/or other additives. Suitable carriers and additives may be solid or liquid, and they correspond to the substances common in formulation practice, such as, e.g. natural or regenerated mineral substances, solvents, dispersing agents, wetting agents, adhesives, thickeners, binding agents or fertilisers.

The compounds of formula I can be applied in the following forms:
solid preparations:
dusts, scattering agents, granulates, coated granulates, impregnated granulates and homogeneous granulates;
liquid preparations:
a. water-dispersible active-substance concentrates: wettable powders, pastes or emulsions;
b. solutions.

The content of active substance in the described agents is between 0.1 and 95%, preferbly between 1 and 80%. For practical application, dilution concentrations of down to 0.001% suitable.

The active substances of formula I can be formulated, for example, as follows:

Dusts:

The following substances are used in the preparation of (a) a 5% dust, and (b) a 2% dust:

a.

5 parts of active substance,
95 parts of talcum;

b.

2 parts of active substance,
1 part of highly dispersed silicic acid
97 parts of talcum.

The active substances are mixed and ground with the carriers.

Granulate:

The following substances are used to prepare a 5% granulate:

5 parts of active substance,
0.25 part of epichlorohydrin,
0.25 part of cetyl polyglycol ether,
3.50 parts of polyethylene glycol,
91 parts of kaolin (particle size 0.3 − 0.8 mm).

The active substance is mixed with epichlorohydrin and dissolved with 6 parts of acetone; the polyethylene glycol and cetyl polyglycol ether are then added. The solution thus obtained is sprayed onto kaolin, and the acetone subsequently evaporated off in vacuo.

Wettable powder:

The following constituents are used for the preparation of (a) a 40%, (b) and (c) a (25%, and (d) a 10% wettable powder:

a.

40 parts of active substance,
5 parts of sodium lignin sulphonate,
1 part of sodium dibutyl-naphthalene sulphonate,
54 parts of silicic acid;

b.

25 parts of active substance,
4.5 parts of calcium lignin sulphonate,
1.9 parts of Champagne chalk/hydroxyethyl cellulose mixture (1:1),
1.5 parts of sodium dibutyl naphthalene sulphonate;
19.5 parts of silicic acid,
19.5 parts of Champagne chalk,
28.1 parts of kaolin;

c.

25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminium silicate,
16.5 parts of kieselguhr,
46 parts of kaolin;

d.

10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration. Such suspensions are used for the treatment of plants to protect them from bacterial infestation.

Emulsifiable concentrates:

The following substances are used to prepare a 25% emulsifible concentrate:

25 parts of active substance,
2.5 parts of epoxidised vegetable oil,
10 parts of an alkylarylsulphonate/fatty alcohol polyglycol ether mixture,
5 parts of dimethylformamide,
57.5 parts of xylene.

It is possible to prepare from these concentrates, by dilution with water, emulsions of any desired concentration, which are suitable for application to plants to protect them from phytopathogenic bacteria.

The following examples further illustrate the invention, without limiting the scope thereof. The temperature values are expressed in degrees Centigrade.

Example illustrating the preparation of active substances 1. 50 ml of concentrated sulphuric acid is added dropwise at 0°–5° C, with vigorous stirring, to 38.6 g of 3.5-dichloro-2-hydroxy-benzyl alcohol in 25 ml of methanol and 32 ml of 35% aqueous formaldehyde solution. Stirring is continued at the same temperature for 3 hours; the mixture is diluted with ice water, and the product is filtered off, thoroughly washed with water and then dried in vacuo.

Recrystallisation from alcohol yields the product 6,8-dichloro-1,3-benzodioxane in a yield of 26.0 g; melting point 111°–112° C (compound 1).

2. A solution of 38.6 g of 3,5-dichloro-2-hydroxy-benzyl-alcohol, 20.0 g of n-capronaldehyde and 0.1 g of p-toluene-sulphonic acid in 500 ml of benzene is boiled of 3 hours in a water separator. The reaction solution is washed with saturated potassium bicarbonate solution and then with water; it is subsequently dried by means of sodium sulphate and completely concentrated by evaporation.

The resulting product remains as oil. To purify the product, it is dissolved in 150 ml of hot acetonitrile, and caused to crystallise by cooling to 0° C. The pure 2-n-pentyl-6,8-dichloro-1,3-benzodioxane melts at 36°–37° C; yield 35.0 g (compound 2). The following compounds are prepared in an analogous manner:

| No. | Compound | Physical data |
|---|---|---|
| 3 | 6,8-dibromo-1,3-benzodioxane | M.P. 114–115° |
| 4 | 2-isopropyl-6,8-dibromo-1,3-benzodioxane | |
| 5 | 2-styryl-6,8-dichloro-1,3-benzodioxane | M.P. 98–100° |

-continued

| No. | Compound | Physical data |
|---|---|---|
| 6 | 2-(1-propen-1-yl)-6,8-dichloro-1,3-benzodioxane | M.P. 79–83° |
| 7 | 2-(1-propen-1-yl)-6,8-dibromo-1,3-benzodioxane | |
| 8 | 2-ethyl-6-chloro-8-bromo-1,3-benzodioxane | |
| 9 | 2-ethyl-6-bromo-8-chloro-1,3-benzodioxane | |
| 10 | 2-methyl-6,8-dichloro-1,3-benzodioxane | M.P. 101–102° |
| 11 | 2-ethyl-6,8-dichloro-1,3-benzodioxane | M.P. 42–43° |
| 12 | 2-n-propyl-6,8-dichloro-1,3-benzodioxane | M.P. 57–58° |
| 13 | 2-isopropyl-6,8-dichloro-1,3-benzodioxane | M.P. 31–32° |
| 14 | 2-n-butyl-6,8-dichloro-1,3-benzodioxane | M.P. 54–55° |
| 15 | 2-isobutyl-6,8-dichloro-1,3-benzodioxane | B.P. 125°/0.05 Torr |
| 16 | 2-tert-butyl-6,8-dichloro-1,3-benzodioxane | B.P. 130°/0.05 Torr |
| 17 | 2-sec.-amyl-6,8-dichloro-1,3-benzodioxane | B.P. 120°/0.05 Torr |
| 18 | 2-(3-amyl)-6,8-dichloro-1,3-benzodioxane | B.P. 120°/0.05 Torr |
| 19 | 6-bromo-8-chloro-1,3-benzodioxane | |
| 20 | 6-chloro-8-bromo-1,3-benzodioxane | |
| 21 | 2-n-propyl-6,8-dibromo-1,3-benzodioxane | |
| 22 | 2-ethyl-6,8-dibromo-1,3-benzodioxane | |
| 23 | 2-methyl-6-chloro-8-bromo-1,3-benzodioxane | |
| 24 | 2-methyl-6-bromo-8-chloro-1,3-benzodioxane | |
| 25 | 2-n-propyl-6-chloro-8-bromo-1,3-benzodioxane | |
| 26 | 2-n-propyl-6-bromo-8-chloro-1,3-benzodioxane | |
| 27 | 2-isopropyl-6-chloro-8-bromo-1,3-benzodioxane | |
| 28 | 2-isopropyl-6-bromo-8-chloro-1,3-benzodioxane | |
| 29 | 2-n-butyl-6-chloro-8-bromo-1,3-benzodioxane | |
| 30 | 2-n-butyl-6-bromo-8-chloro-1,3-benzodioxane | |
| 31 | 2-(1-propen-1-yl)-6-chloro-8-bromo-1,3-benzodioxane | |
| 32 | 2-(1-propen-1-yl)-6-bromo-8-chloro-1,3-benzodioxane | |
| 33 | 2-methyl-6,8-dibromo-1,3-benzodioxane | |

Biological examples a. Action against Pseudomonas lachrymans on cucumbers (Cucumis sativus)

Cucumbers were cultivatd for 12 days in a greenhouse and were then sprayed with the test substance in the form of a spraying mixture (conc. 0.1% of active substance) until dripping wet. The applied coating was allowed to dry, and the plants were subsequently placed into a controlled-atmosphere chamber at 24° C with about 95% relative humidity. Twenty four hours later, the plants were infested, by the spraying of the underside of the primary leaves, with a standardised suspension of Pseudomonas lachrymans. After an incubation period of 8 days in the same chamber, there were formed on these leaves large, angular spots permeated by water. The number of such spots per primary leaf served as an evaluation basis for the effectiveness of the test substance.

The following results were obtained with spray concentrations of 1000 ppm:

| Compound No. | Infestation |
|---|---|
| 1 | <20% |
| 2 | <20% |
| 3 | <20% |
| 4 | <30% |
| 5 | <30% |
| 6 | <20% |
| 8 | <20% |
| 9 | <20% |
| 10 | <20% |
| 11 | <20% |
| 12 | <20% |
| 13 | <20% |
| 14 | <30% |
| 15 | <30% |
| 16 | <20% |
| 17 | <20% |

-continued

| Compound No. | Infestation |
|---|---|
| 18 | <20% |
| 19 | <20% |
| 20 | <20% |
| 22 | <30% |
| 23 | <20% |
| 24 | <20% |
| 33 | <30% | b. Action against Xanthomonas vesicatoria on paprika (Capsicum annuum)

Paprika plants were cultivated for 3 weeks in a greenhouse and were then sprayed with the test substance in the form of a spraying mixture (conc. 0.1% of active substance) until dripping wet. The applied coating was allowed to dry, and the plants were subsequently placed in a controlled-atmosphere chamber at 24° C with about 95% relative humidity. Twenty-four hours later, the plants were infested by the spraying of the underside of the leaves with a standardised suspension of Xanthomonas vesicatoria. After an incubation period of 8 days in the same chamber, there were present on the leaves dark-green spots which became brown later on. The average number of spots per leaf served as a basis of evaluation for the effectiveness of the test substance.

With a concentration of 1000 ppm, compound 2 exhibited a good action (i.e. infestation of plants less than 20% of that in the case of the untreated but infested control group).

c. Action against Pseudomonas phaseolicola on bean plants (Phaseolus vulgaris).

Bean plants were cultivated for 8 days in a greenhouse, and were then sprayed with the test substance in the form of a spraying mixture (conc. 0.1% of active substance) until dripping wet. The applied coating was allowed to dry, and the plants were subsequently placed into a controlled-atmosphere chamber at 24° C with about 95% relative humidity. Twenty-four hours later, the plants were infested by the spraying of the underside of the primary leaves with a standardised suspension of *Pseudomonas phaseolicola*. After an incubation period of 8 days in the same chamber, there were formed on these leaves point-like spots permeated by water and having a yellow areola. The average number of such spots per leaf served as a basis of evaluation for effectiveness of the test substance. At a concentration of 1000 ppm, compounds 1 and 3 exhibited a good action (i.e. infestation of plants less than 20% of that in the case of the untreated but infected control group.

What we claim is:

1. A method for combatting phytopathogenic bacteria which comprises applying to the plant locus a bactericidally effective amount of a compound of the formula

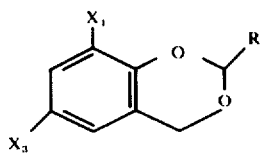

(I)

wherein

R represents hydrogen, $C_1$-$C_6$-alkyl, $C_2$-$C_6$-alkenyl or styryl, and $X_1$ and $X_3$ each independently represent chlorine or bromine.

2. The method of claim 1, wherein said compound corresponds to the formula

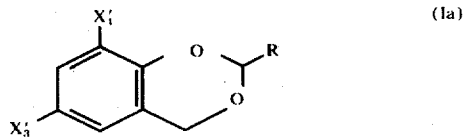

(Ia)

wherein

R represents $C_1$-$C_6$-alkyl, $C_2$-$C_6$-alkenyl or styryl, and $X'_1$ and $X'_3$ each independently represent chlorine or bromine, and wherein R also stands for hydrogen if one of the substituents $X'_1$ and $X'_3$ represents chlorine and the other bromine.

3. The method of claim 1, wherein in said compound R represents hydrogen, $C_1$-$C_6$-alkyl, $C_3$-alkenyl or styryl, and $X_1$ and $X_3$ represent chlorine.

4. The method of claim 3, wherein said compound is 6,8-dichloro-1,3-benzodioxane.

5. The method of claim 3, wherein said compound is 2-n-pentyl-6,8-dichloro-1,3-benzodioxane.

6. The method of claim 3, wherein said compound is 2-ethyl-6,8-dichloro-1,3-benzodioxane.

7. The method of claim 1, wherein said compound is 2-ethyl-6,8-dibromo-1,3-benzodioxane.

* * * * *